May 8, 1934.   J. M. MITCHELL   1,957,898
SETTLING APPARATUS
Filed July 28, 1930
Fig. 1.
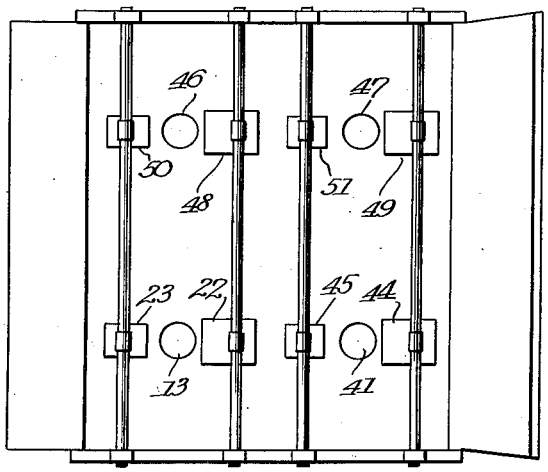
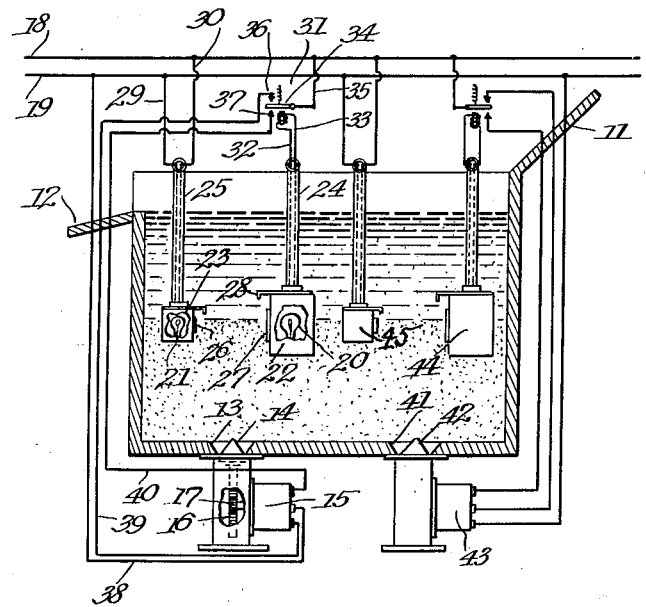
Fig. 2.
Inventor
James Macdonald Mitchell.
By Morrison, Kennedy & Campbell
Attorney Patented May 8, 1934

1,957,898

UNITED STATES PATENT OFFICE 1,957,898

SETTLING APPARATUS

James Macdonald Mitchell, Flushing, N. Y.

Application July 28, 1930, Serial No. 471,303

15 Claims. (Cl. 210—51)

This invention relates to settling apparatus and, more particularly, to automatic means for controlling the discharge of settled materials from such devices.

It is one object of this invention to utilize automatically operative electrical mechanism to control the discharge from a settling tank such that when a given quantity of material has settled out of suspension the mechanism will operate to open the tank discharge, and when the desired amount of settled material has passed out of the tank the mechanism will automatically close the discharge.

It is another broad object of this invention to control the discharge from a settling tank in accordance with variations in density or opacity of the materials in the tank and in particular to utilize the differences in light-carrying ability of the suspending and suspended materials to control the discharge of the materials which settle out of suspension.

Another object of my invention is to utilize electrical mechanism to regulate the discharge from a settling tank and to employ non-electrical mechanism operable in accordance with variations in density of materials in the tank to control the electrical discharge mechanism, in such manner as to give automatic operation.

Still another object is to utilize photo-electric mechanism to automatically control the operation of the discharge mechanism of a settling apparatus.

A further object of this invention is to provide an automatically operative settling apparatus which may be employed in connection with all types of material, and which is especially adapted for settling out what are known in ore-dressing practice as slimes and fines.

It will appear to those skilled in the art that my invention may have wide application and many diverse uses, and I desire that the scope of my invention shall be determined by the appended claims, regardless of the particular use to which the combination may be put. In the accompanying drawing I have illustrated exemplary forms of my invention so that those skilled in the art may be properly instructed in the use thereof.

In the drawing:

Fig. 1 is a top plan view of a settling tank showing generally the arrangement of parts of the photo-electric mechanism which controls the discharge of the settling tank;

Fig. 2 is a view comprising a vertical section of the apparatus shown in Fig 1 and a diagrammatic representation of the electrical circuit of my electrical discharge mechanism and the photo-electric control for such mechanism.

It is, of course, readily appreciated by those skilled in the art that when material is supplied to a settling tank particles of material held in suspension will gradually sink to the bottom of the tank by reason of the force of gravity. When an appreciable quantity of material has settled out of suspension in the bottom of the tank, means must be provided to effect their discharge. It has been the prior practice in the art to effect discharge manually or by utilization of the force of gravity and in some instances to utilize the level of the settled or unsettled material in the tank to accomplish this purpose.

Referring now to Fig. 2, the reference numeral 10 denotes, generally, a settling tank which may have any desired proportions and shape. The materials to be settled will be fed into the tank at an intake 11. An overflow discharge may be provided, as shown at 12. A discharge 13 for settled material is located in the bottom of the tank and a valve 14 positioned to control flow from the discharge. 15 denotes, generally, an electrical mechanism for operating the discharge valve 14. Various means for this purpose may be utilized, such as an electro-magnet or, as shown, a reversible motor unit which may actuate the valves through suitable means such as a rack 16 on the valve stem coacting with a gear 17 of the motor unit. The particular construction of the motor unit does not form a part of this invention and it may be stated that the motor and valve are available commercially as a single unit. It is, of course, necessary that suitable mechanism be provided in connection with the motor whereby when the valve becomes seated the motor will automatically stop and, conversely, when the motor is actuated by the control mechanism to open the valve, it will be automatically stopped after the valve has moved a predetermined distance from its seat. Current is supplied to the motor from power wires 18 and 19 through a circuit which will hereafter be described in connection with the controlling mechanism which constitutes the subject-matter of the present invention.

My invention involves essentially the automatic control of the discharge of a settling apparatus and, in connection therewith, the electrical discharge mechanism heretofore described. The control mechanism is dependent on variations in the density or opacity of material in the tank and, in its preferred embodiment, becomes operative when a definite quantity of material has settled in the bottom of the tank.

While I prefer to utilize my control mechanism operating on the above-stated principle in connection with an electrical discharge mechanism, it is to be understood that such controlling mechanism may operate through intermediate electrical mechanism to control a mechanically operated discharge.

Structurally, my control device comprises a photo-electric mechanism 20 and a source of illumination 21 adapted to direct a beam of light against the same. These elements are housed in suitable water-tight opaque casings 22 and 23, respectively, suspended in the tank by means of hollow supports 24 and 25. A beam of light is transmitted from the source of illumination through a bulls-eye 26 in the casing 23 to the photo-electric cell through a corresponding bulls-eye 27 in the casing 22. To prevent particles of material from lodging around the bulls-eyes in the casings, it is advisable to provide hoods over the bulls-eyes, such as indicated by the reference numeral 28. The source of illumination may be connected to the power wires 18 and 19 by means of suitable wires 29 and 39 leading through the support 25.

The photo-electric cell, as is well known, functions to vary the flow of current in an electric circuit in accordance with the intensity of light to which it is subjected. The variations in current being relatively small, it is necessary for commercial purposes to have the photo-electric cell operate through an amplifier which serves to amplify the current variations. A unit consisting of a photo-electric cell and amplifier is available commercially and is admirably suited for use in my control device. For purposes which will hereafter be made clear, I utilize a unit in which the cell and amplifier are arranged in a circuit such that the current in the amplifier will be increased when the intensity of light to which the cell is subjected decreases, and vice versa. For the purpose of clarity the connections between the photo-electric cell and amplifier unit, with the power lines 18 and 19 from which it derives current, have not been shown.

The amplifier of the photo-electric unit is connected to the coil of an electric relay 31 through wires 32 and 33 leading through the hollow support 24. The armature 34 of the relay is connected with one of the power lines 18, by wire 35, and is ordinarily held against a contact point 36, as by means of a spring. A second contact point 37 is positioned so that when the current in the photo-electric amplifier increases the coil of the relay will attract the armature to break the circuit through contact point 36 and make contact with the contact point 37.

With the arrangement just described, it will be apparent that the photo-electric mechanism acting through the relay is admirably suited to act as a circuit maker and breaker for electric circuits, operating in accordance with the variations in intensity of light falling on the photo-electric cell. When a single electro-magnet is utilized to actuate the discharge valve of the settling tank, it will be apparent that only a single electric circuit, including the relay, is necessary, as with such a device a weight or spring may be employed to close the valve after it has been opened by the magnet due to closing of the magnet's connections with the power line by the relay. However, where a two-way electro-magnetic actuating device for both opening and closing the valve, or a reversible motor such as illustrated at 15, is used, a double contact relay with both contact points 36 and 37 is necessary. One terminal of the motor is connected with the power line 19 through wire 38. The other two terminals which enable running of the motor in either direction so as to both open and close the valve are connected, respectively, through wires 39 and 40 with the relay contact points 36 and 37, so that either one or the other at all times makes connection with the power line 18 through the relay armature to make a complete circuit for the motor. As has previously been mentioned, a motor unit is employed which will automatically cut off after the motor has run sufficiently to bring the valve to full open or full closed position.

Having now fully described the photo-electric control device and the discharge valve operating mechanism, the operation of my settling tank will become clear. Until material of definite amount has settled in the tank light will be transmitted from the source of illumination to the photo-electric unit through the medium of the suspending liquid in the tank which is substantially transparent. Since, of course, the liquid carries solid particles in suspension, it will be cloudy with the result that an intense source of illumination should be used, and the photo-electric unit should be located quite close to such source with the view of having light at all times transmitted through the liquid.

For best operation, the photo-electric cell should be of a type which is only responsive to large changes in the intensity of illumination. It will of course be obvious that as the level of materials settling in the tank rises the illumination from the source will be cut off from the photo-electric cell due to the greater relative density or opacity of the settled materials over the suspending liquid. By using a cell responsive only to large changes in illumination, it is possible to cause the cell to increase the current in the relay sufficient to attract its armature only when the light has been cut off completely by the rise of settled materials between the source of illumination and the cell. When this has occurred, the armature will be attracted to form a complete circuit between the power line and the motor through contact 37 and thus cause the motor to open the discharge valve to allow the settled materials to flow out of the tank. As soon as a substantial quantity of materials have been discharged the level of the dense settled materials remaining will fall below that of the controlling unit and light will again be transmitted from the source of illumination to the photo-electric cell, whereupon the current in the amplifier will decrease and allow the armature to spring up against contact point 36 which forms a reverse circuit for the motor to cause the latter to close the discharge valve.

When materials are steadily fed into the tank, the discharge mechanism will operate periodically so often as the level of settled materials rises in the tank to cut off the source of illumination from the photo-electric cell. Since my control mechanism is extremely accurate, and acts independently of the weight of the settled materials, it is admirably suited for use in a settling tank for slimes and fines as well as for coarser materials. Further, my apparatus has no revolving or other agitating parts which tend to prevent particles of low specific gravity or fine physical form from settling, and the only movement accompanying discharge is that of the valve which is at the bottom of a comparatively thick bed of settled particles whose surface is only slightly agitated by the discharge of the under-bed of materials. Hence, slimes and fines may be discharged more quickly and with less liquid passing out of the discharge with them than has heretofore been possible with known methods.

Referring to Figs. 1 and 2, it will be observed that I have shown how a plurality of independently operative photo-electric control mechanisms may be arranged to operate separate valved-discharges so that materials settling in various parts of the tank may be independently discharged. Thus, coarser or heavier particles which settle more rapidly and, hence, nearer the intake 11, may be discharged through the discharge 41 controlled by a valve 42 actuatable by a motor 43, while the finer material will be discharged through the discharge 13 controlled by the valve 14 through actuating mechanism heretofore described in detail.

The motor 43 is controlled through a photo-electric unit housed in a casing 44 which receives its illumination from a source located in a casing 45. The circuit between the motor and unit is identical with that between the motor 15 and unit 20 for the valve 14, previously described. In order that the several discharge valves may function independently, the casings for the several photo-electric units and sources of illumination should be opaque except for the corresponding lenses or bulls-eyes, as otherwise one photo-electric unit might receive illumination from the wrong source.

As shown in Fig. 1, additional discharges such as 46 and 47 with suitable photo-electric controlling mechanisms 48 and 49, and sources of illumination 50 and 51, respectively, may be provided, each operating independently of the other by arrangement of circuits such as previously described, and shown in Fig. 2.

I claim:

1. In combination, a tank adapted to receive materials of varying density, a discharge in said tank, means controlling said discharge, and means responsive to variations in the opacity of materials received in the tank for actuating said discharge controlling means.

2. In a settling apparatus, a discharge for settled materials, means for controlling said discharge, and means operative in accordance with variations in the opacity of materials in the tank for actuating said discharge controlling means.

3. In a settling apparatus, a tank, a discharge for settled materials, means for controlling said discharge, and means operative in accordance with variations in the opacity of materials at a definite level in the tank for actuating said discharge controlling means.

4. In a settling apparatus, a tank, a discharge for settled materials, means for controlling said discharge, and means operative in accordance with variations in transparency of materials in the tank for actuating said discharge controlling means.

5. In a settling apparatus, a tank, a discharge for settled materials, a valve controlling said discharge, and light responsive means operative when the density of materials is such as to render them opaque for opening said discharge valve.

6. In a settling apparatus, a tank, a discharge for settled materials, a valve controlling said discharge, and light responsive means operative to open said valve when the materials at a definite level in the tank are opaque and operative to close said valve when the materials at said level are transparent.

7. In a settling apparatus, a tank, a discharge for settled materials, means controlling sa'd discharge, a source of illumination, light-respons've means positioned to receive varying intensities of illumination from said source in accordance with variations in transparency of materials in the tank for actuating said controlling means.

8. In a settling apparatus, a tank, a discharge for settled materials, means controlling said discharge, photo-electric means for actuating said controlling means, a source of illumination, said source and said photo-electric means being so positioned that the former will transmit to the latter through the medium of the materials in the tank illumination which varies in intensity in accordance with variations in density of materials at a definite level in the tank, the photo-electric means when the density is such as to render the materials opaque and bar the transmission of illumination from the source being operative to actuate the discharge control means.

9. In a settling apparatus, a tank, a discharge for settled materials, means controlling said discharge, photo-electric means for actuating said controlling means, a source of light, said source and said photo-electric means being positioned so that the former will transmit illumination to the latter through the medium of the materials in the tank.

10. In a settling apparatus, a tank, a discharge for settled materials, electrical means for controlling said discharge, electric circuits including said electrical light-responsive means and a source of current, and means located in the tank and operative in accordance with variations in level of settled materials in the tank for making and breaking said electric circuits.

11. In combination, a tank adapted to receive materials of varying density, a discharge in said tank, electrical means for controlling said discharge, electric circuits including said electrical means and a source of current, and light responsive means operative according to variations in density of materials received in the tank for making and breaking said electric circuits.

12. In a settling apparatus, a tank, a discharge for settled materials, electrical means for controlling said discharge, electric circuits including said electrical means and a source of current, and means operative in accordance with variations in the opacity of materials in the tank for making and breaking said electric circuits.

13. In a settling apparatus, a tank, a discharge in said tank for settled materials, electrical means for controlling said discharge, electric circuits including said electrical means and a source of current, and means responsive to variations in transparency of materials in the tank for making and breaking sa'd electric circuits.

14. In a settling apparatus, a tank, a discharge for settled materials, electrical means controlling said discharge, electric circuits including said electrical means and a source of current, a source of illumination, and means for making and breaking said electric circuits and acting therethrough to operate the discharge control means comprising photo-electric means positioned to receive illumination from sa'd source through the medium of materials in the tank intermittently as the density in the tank varies with the rise and fall in level of the dense settled body of materials.

15. In a settling apparatus, a tank, a plurality of discharges, electrical means for controlling the several discharges, electric circuits including said electrical means and a source of current, and means responsive to variations in the opacity of materials in different parts of the tank for making and break'ng the electric circuits of the several discharge controlling means.

JAMES MACDONALD MITCHELL.